United States Patent
Dowell et al.

(10) Patent No.: US 6,608,933 B1
(45) Date of Patent: Aug. 19, 2003

(54) LOSS TOLERANT COMPRESSED IMAGE DATA

(75) Inventors: Craig M. Dowell, Redmond, WA (US); Geoffrey T. Dunbar, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 678 days.

(21) Appl. No.: 08/953,219

(22) Filed: Oct. 17, 1997

(51) Int. Cl.[7] .................................................. G06K 9/36
(52) U.S. Cl. ........................ 382/232; 382/233; 382/244
(58) Field of Search ................................. 382/232, 233, 382/234, 235, 236, 238, 239, 240, 241, 242, 243, 244, 245, 246, 248, 250, 251, 252, 253, 197, 209; 341/67, 65; 358/427; 711/1; 345/509; 73/602; 702/76; 708/420, 801; 370/450; 348/719, 699, 718

(56) References Cited

U.S. PATENT DOCUMENTS

| | | | | | |
|---|---|---|---|---|---|
| 4,835,607 A | * | 5/1989 | Keith | ........................... | 358/133 |
| 5,448,310 A | * | 9/1995 | Kopet et al. | ................. | 348/699 |
| 5,486,876 A | * | 1/1996 | Lew et al. | ................... | 348/719 |
| 5,586,200 A | * | 12/1996 | Devaney et al. | ............ | 382/232 |
| 5,603,012 A | * | 2/1997 | Sotheran | ....................... | 395/500 |
| 5,604,824 A | * | 2/1997 | Chui et al. | ................... | 382/248 |

* cited by examiner

Primary Examiner—Andrew W. Johns
Assistant Examiner—Duy M. Dang
(74) Attorney, Agent, or Firm—Law Offices of Albert S. Michalik, PLLC

(57) ABSTRACT

A system and method for configuring image data, such as data suitable for JPEG compression, into a format that can be streamed and displayed even if part of the image is lost in transmission. The image data is scrambled and compressed into restartable segments of compressed data. After compression, the data is packetized, with segment restart information written into headers accompanying the payload in each packet. When the packets arrive, they are parsed to determine from their restart information which restart segments have arrived. Each restart segment that has arrived is sent to an image decompressor, resulting in a scrambled bitmap image, having gaps wherever data segments were lost. The image is then unscrambled, resulting in small, isolated blocks of missing data psuedo-randomly dispersed throughout the image. Fill-in techniques from the surrounding pixels further improve the perceived image quality.

30 Claims, 19 Drawing Sheets

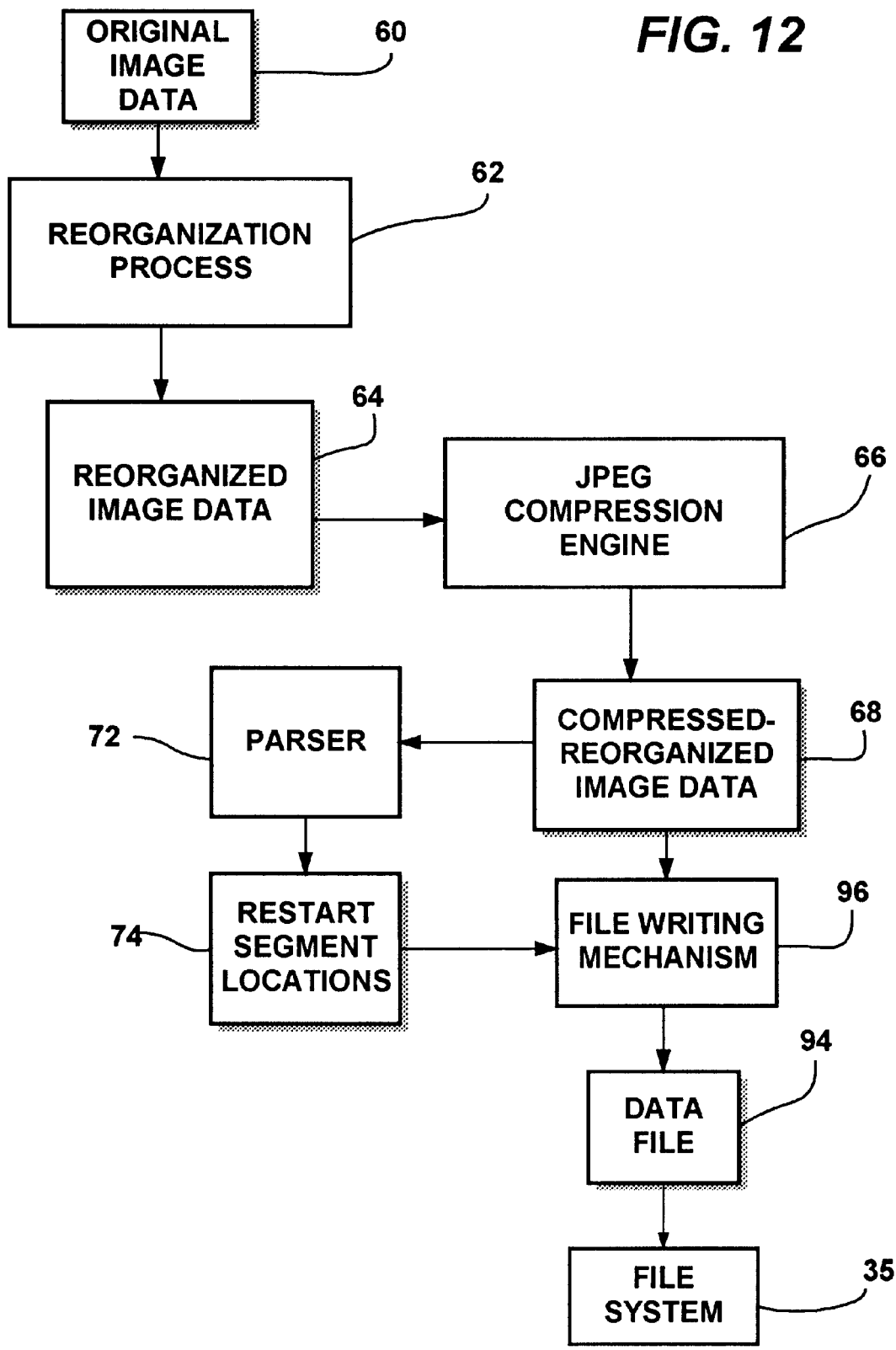

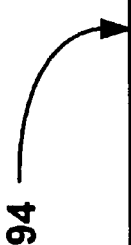

| Contents | Size (Bytes) | Description |
|---|---|---|
| File Magic Number | 4 | "DJFM" |
| Header Magic Number | 4 | "DJHM" |
| Header Size | 4 | Size, in bytes, of the header data |
| Header Data | ? | The JPEG header data |
| Map Magic Number | 4 | "DJMM" |
| Map Section Size | 4 | Size, in bytes, of this section |
| Map Data | ? | A structure containing height, width, restart interval |
| Restart Segment Locations | ? | An array of the offsets of the restart segments in the image data |
| Data Magic Number | 4 | "DJEM" |
| Data Size | 4 | Size, in bytes, of the image data |
| Image Data | ? | The image data |

| 1,1 | 1,2 | //// | | 1,5 | 1,6 | 1,7 | 1,8 | 1,9 | 1,10 | 1,11 | 1,12 | 1,13 | 1,14 |
|---|---|---|---|---|---|---|---|---|---|---|---|---|---|
| 2,1 | 2,2 | 2,3 | 2,4 | 2,5 | 2,6 | 2,7 | 2,8 | 2,9 | 2,10 | 2,11 | //// | | 2,14 |
| 3,1 | 3,2 | 3,3 | 3,4 | 3,5 | 3,6 | 3,7 | //// | 3,9 | 3,10 | 3,11 | 3,12 | 3,13 | 3,14 |
| 4,1 | //// | | 4,4 | 4,5 | 4,6 | 4,7 | 4,8 | 4,9 | 4,10 | 4,11 | 4,12 | 4,13 | 4,14 |
| 5,1 | 5,2 | 5,3 | 5,4 | 5,5 | 5,6 | 5,7 | 5,8 | 5,9 | 5,10 | //// | | 5,13 | 5,14 |
| 6,1 | 6,2 | 6,3 | 6,4 | 6,5 | //// | | 6,8 | 6,9 | 6,10 | 6,11 | 6,12 | 6,13 | 6,14 |
| 7,1 | //// | 7,3 | 7,4 | 7,5 | 7,6 | 7,7 | 7,8 | 7,9 | 7,10 | 7,11 | 7,12 | 7,13 | 7,14 |
| 8,1 | 8,2 | 8,3 | 8,4 | 8,5 | 8,6 | 8,7 | 8,8 | 8,9 | 8,10 | //// | 8,12 | 8,13 | 8,14 |
| 9,1 | 9,2 | 9,3 | 9,4 | //// | | 9,7 | 9,8 | 9,9 | 9,10 | 9,11 | 9,12 | 9,13 | 9,14 |
| //// | 10,2 | 10,3 | 10,4 | 10,5 | 10,6 | 10,7 | 10,8 | 10,9 | 10,10 | 10,11 | 10,12 | 10,13 | //// |
| 11,1 | 11,2 | 11,3 | 11,4 | 11,5 | 11,6 | 11,7 | 11,8 | //// | | 11,11 | 11,12 | 11,13 | 11,14 |
| 12,1 | 12,2 | 12,3 | 12,4 | //// | 12,6 | 12,7 | 12,8 | 12,9 | 12,10 | 12,11 | 12,12 | 12,3 | 12,14 |
| //// | 13,2 | 13,3 | 13,4 | 13,5 | 13,6 | 13,7 | 13,8 | 13,9 | 13,10 | 13,11 | 13,12 | 13,13 | //// |
| 14,1 | 14,2 | 14,3 | 14,4 | 14,5 | 14,6 | 14,7 | //// | | 14,10 | 14,11 | 14,12 | 14,13 | 14,14 |

*FIG. 17*

LOSS TOLERANT COMPRESSED IMAGE DATA

FIELD OF THE INVENTION

The present invention relates generally to computers and streaming data, and more particularly to an improved method and system for streaming data over computer networks.

BACKGROUND OF THE INVENTION

Current image compression standards, and the JPEG standard in particular, function well in compressing and decompressing image data. For example, the standard JPEG image compression algorithm yields excellent image quality to compression ratios, especially on photographic or other realistic images. This makes it an excellent scheme for sending images across a network, where the data size is ideally as small as possible to minimize the transmission time. In particular, JPEG is a good compression scheme for sending data via a World Wide Web server where the entire image data is guaranteed to be received.

However, JPEG has certain limitations, including that a JPEG image, as commonly used, cannot be displayed until all of the data has been received. Thus, a long time may pass before the image appears, leading the viewer to wonder about the status of the image. More importantly, if the JPEG header is lost or corrupted when sent across the network, or if, as commonly used, part of the subsequent transmission is lost or corrupted, none of the image can be displayed. This is because of the way that the JPEG compression scheme works; after some initial data, the subsequent image data is based on the data that preceded it. Once such preceding data is lost, the subsequent data is relatively meaningless.

Web browsers and servers work around these limitations in two ways. First, with web browsers and servers, all data is transmitted by a reliable network protocol, so that the image data is "guaranteed" to arrive in its entirety, and be uncorrupted. Secondly, some web browsers support an uncommonly used part of the JPEG standard, called progressive JPEG. With this scheme, the image is sent in cycles, with each cycle adding more detail and clarity to the image. This means the image can be displayed (at a lower resolution) when only part of the image has been received, and then subsequently updated and improved as more of the data arrives.

However, in a streaming environment, rapid transmission is desirable, and retransmission is generally too late to be of value. Consequently, low overhead protocols including UDP (User Datagram Protocol) are used for streaming. Moreover, the multicast protocol sends images to multiple recipients, and there is no reasonable way to retransmit selected packets to those who did not receive them, yet remain in synchronization with those who did receive those packets. The protocols used in streaming, such as UDP, are thus unreliable and there is no guarantee that the entire image data will be delivered.

As a result, it often occurs that some of the data is lost in transmission, even if the streaming connection remains functioning. In such a situation, where part of the JPEG image (as commonly used) is received but part of it is lost, none of the image can be displayed. Progressive JPEG would allow part of the image to be displayed, but only of the data loss is towards the end of the transmitted data; if the first part of the compressed data is lost, nothing can be displayed. Moreover, packets tend to be lost in sequence, whereby even if the image could be partially recreated, the consecutive missing blocks would leave substantial gaps in the image.

OBJECTS AND SUMMARY OF THE INVENTION

Accordingly is an objective of the present invention to provide a system and method for configuring JPEG data for streaming transmission that tolerates lost data, enabling a partially received image to be displayed.

In accomplishing that objective, it is a related objective to reduce the likelihood of continuous gaps in a partially-received image.

Another objective is to provide a method and system as characterized above that works with existing JPEG compressors and decompressors.

Still another objective is to provide a method and system of the above kind that enables the configured JPEG data to be stored for subsequent recall and transmission.

Yet another objective is to provide such a system and method that is flexible, efficient, reliable and extensible.

Briefly, the present invention provides a system and method for configuring data, such as pixel image data grouped into JPEG minimum coded units (MCUs), into data that is loss tolerant. The original data are first reorganized into a reversible pattern of reorganized data before compression, e.g., the MCUs are rearranged relative to each other. Then, the data is compressed into restartable segments, for example by providing restart interval information to a JPEG compressor along with the reorganized MCUs. The data is next packetized for transmission, or alternatively saved in a file. If packetized, the location information for at least some of the compressed segments are written into the packets containing at least part of those segments. If saved, the data may be written to a file before or after packetization.

If less than all of the packets are received after transmission thereof, the segments that were received are determined from the location information in the packets that were received. Those segments are decompressed into partial reorganized data, such as JPEG image data, and then the partial reorganized image data is descrambled into partial original image data. The partial original image data may be displayed, and may be enhanced before displaying.

Other objects and advantages will become apparent from the following detailed description when taken in conjunction with the drawings, in which:

BRIEF DESCRIPTION OF THE DRAWINGS

FIG. 12 is a block diagram representing various components for configuring the loss tolerant JPEG data for file storage;

FIG. 13 is a representation of the file format for storing loss tolerant JPEG data;

FIG. 17 is a representation of the partially received image data of FIG. 16 after undergoing a reverse reorganization process;

DETAILED DESCRIPTION OF THE PREFERRED EMBODIMENT

Exemplary Operating Environment

Figure 1:
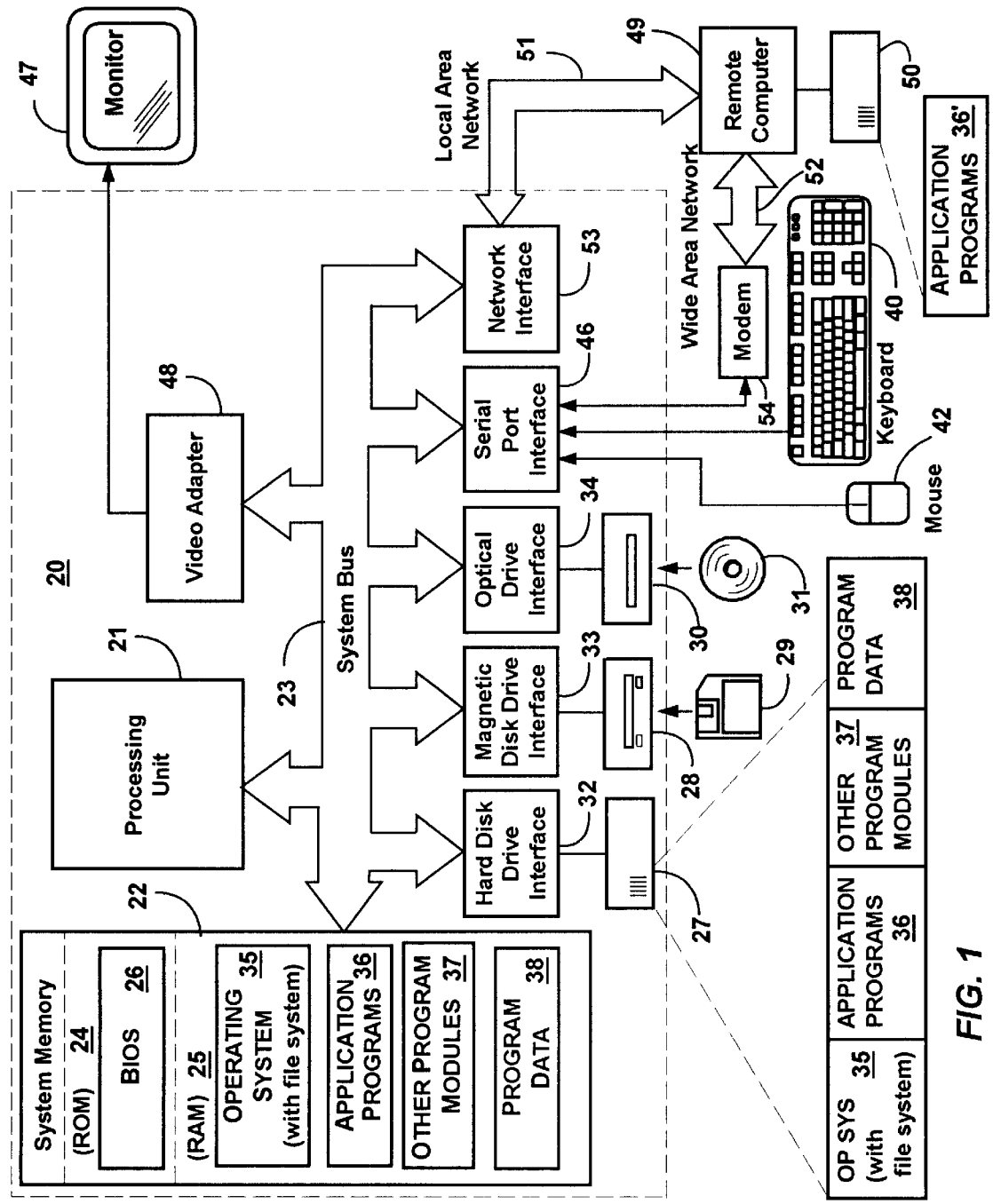
FIG. 1 is a block diagram representing a computer system in which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet. When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Loss Tolerant JPEG

For purposes of the present invention, the above-identified computer system 20 may serve as the system that accomplishes the various steps (described below) to configure loss tolerant JPEG data (e.g., compression and preparation for transmission or storage) in accordance with one aspect of the present invention. Similarly, the computer system 20 may serve as the system that accomplishes the various steps to reconfigure a visible image from loss tolerant JPEG data (e.g., decompression and preparation for display) in accordance with another aspect of the present invention.

Figure 2:
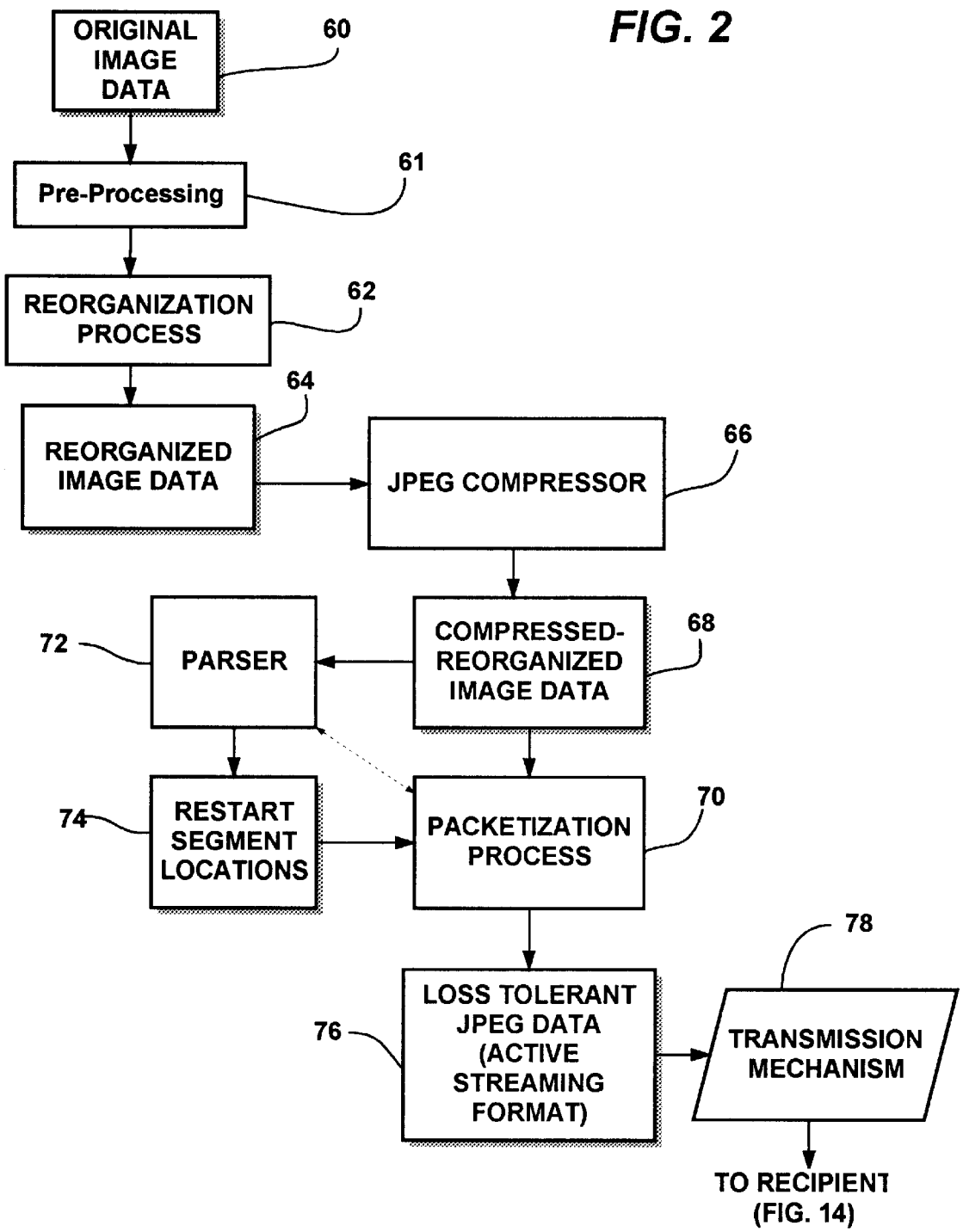
FIG. 2 is a block diagram representing various components for configuring and packetizing image data as loss tolerant JPEG data in accordance with the present invention.
Figure 3:
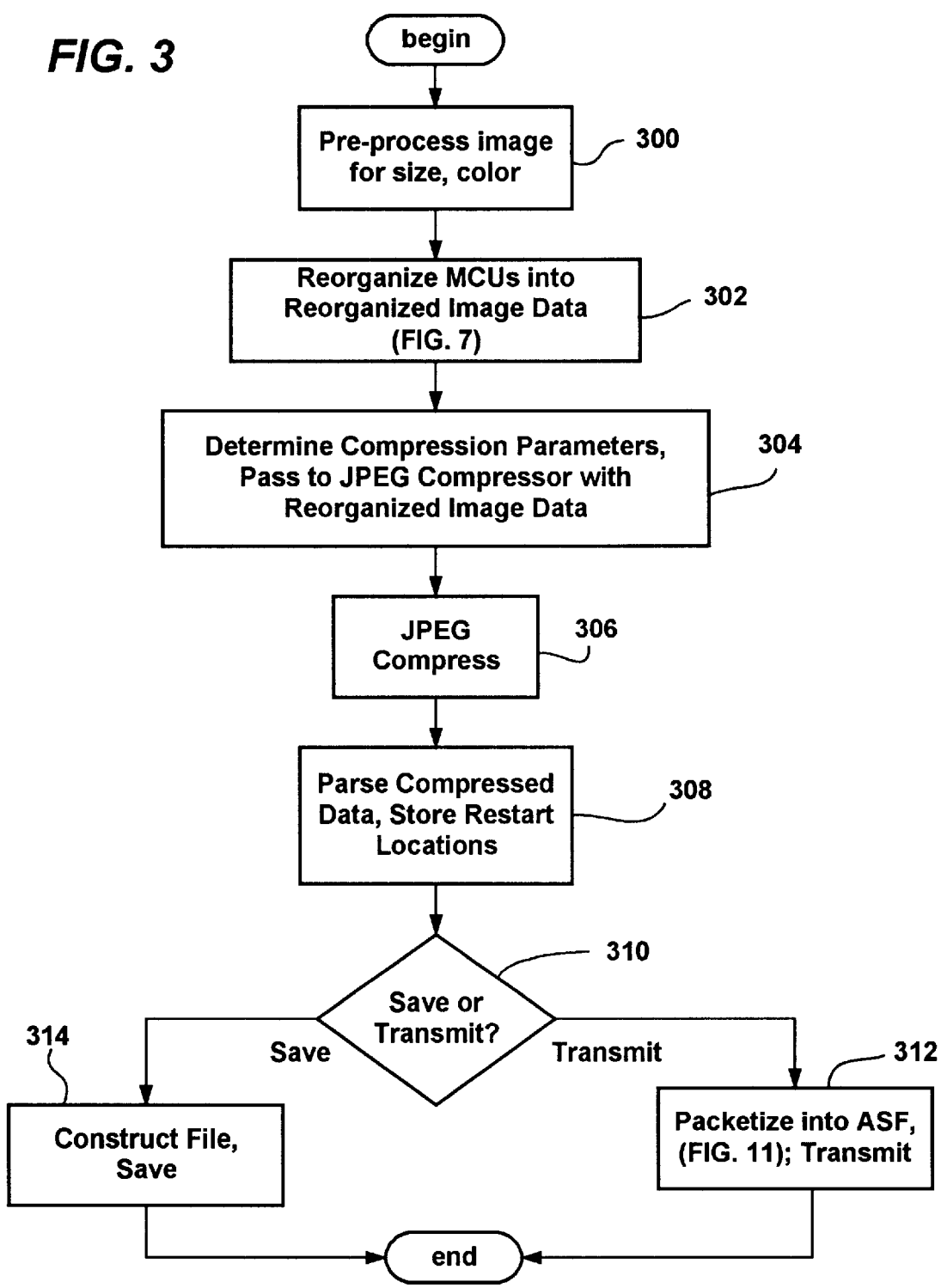
FIG. 3 is a flow diagram generally representing the steps taken to configure the loss tolerant JPEG data in accordance with the present invention.

FIG. 2 generally shows the flow of the JPEG image data 60 through various components to provide loss tolerant JPEG image data in accordance with the present invention. FIG. 3 is a flow diagram generally representing the steps taken by the components of FIG. 2. As shown in FIG. 2 and beginning at FIG. 3, step 300, the original image data 60 may first be fed to a pre-processing mechanism 61 that generally makes the image data suitable for converting to loss tolerant JPEG data. For example, JPEG works with 16 by 16 blocks of pixels (actually pixel information) known as minimum coded units (MCUs). The pre-processing mechanism 61 may pad the image by adding columns or rows of pixels as necessary such that the rows and columns each contain a number of pixels that is evenly divisible by sixteen (or whatever corresponding block height and width values are present) so that there are no partial MCUs. As will become apparent below, this simplifies working with the data. Note that if desired, appropriate padding information may accompany the transmitted image data, whereby padded rows and columns can be stripped off prior to displaying the image. Moreover, it is understood that the present invention can be extended to handle partial MCUs even without such padding.

Similarly, JPEG works with 24-bit color (eight bits each for red, green and blue). The pre-processing mechanism 61 will convert palettized or other types of images to 24-bit per color images, e.g., by looking up the RGB levels in the palette (color lookup table) and/or doing any other needed conversion. Other pre-processing steps such as analyzing the data to determine more-optimal compression parameters may also be performed by this mechanism 61.

In any event, once the original image data 60 is in the proper form, at step 302 of FIG. 3, the original image data 60 is sent to a (pre-compression) reorganization process 62 that scrambles the original data into reorganized image data 64. As will be described in detail below with respect to FIGS. 4–7, the reorganization process 62 provides a mechanism by which any continuous data that is lost in transmission is distributed throughout the image. As a result, upon subsequent decompression, rather than having a continuous, horizontal stripe of MCUs in a partially received image, missing MCUs will be pseudo-randomly scattered in the image.

As further represented in FIG. 2, after the image data is scrambled, the reorganized image data 64 is fed into a JPEG compressor 66. The JPEG compression engine 66 operates in a known manner to compress the data selected data image data into compressed (reorganized) image data 68. For purposes of simplicity, a detailed description of JPEG compression standards is not provided herein. However, in accordance with one aspect of the present invention, the data is not compressed in the way users typically compress images with a JPEG compressor 66. Instead, the present invention leverages an error recovery feature of JPEG compression that allows restart markers to be inserted into the JPEG image data at specified intervals.

In general, JPEG and other compression schemes operate by first transmitting some relatively precise initial absolute value data, followed by subsequent difference data from which subsequent absolute values are derived. For example, JPEG transmits eight (or so) bits of the DC (direct current) component of each DCT (Discrete Cosine Transform) block composing the MCU, (six blocks per MCU). Thereafter, only differences are coded for each MCU, i.e., a difference value indicating the amount that the DC component has changed from one MCU to the next. Typically with JPEG, the entire image data is transmitted as one monolithic segment of the initial data followed by the subsequent data. If any information is lost in the middle of a JPEG transmission, any later information that is received cannot be correctly used because the previous DC data on which it ultimately depends is missing.

However, the restart feature provides a mechanism by which a stream of JPEG data is grouped into multiple segments of initial data (including the absolute DC values) and subsequent data. Within each segment, denoted by each restart marker, new initial data is provided after the marker and the subsequent data in that segment is based upon only the preceding data of that segment. As a result, restart segments allow the occasional refreshing of an image, at the cost of some overhead (on the order of two bytes per marker) and some reduction in compression, but with no reduction in the quality of the image.

The insertion of such restart markers is accomplished simply by the specifying a restart interval to a JPEG compressor 66 that is equipped with this capability (as specified in JPEG standards). As represented by step 304 of FIG. 3, the preferred implementation determines the interval so that there are approximately one-hundred restart segments per image, (e.g., the interval is a whole number based on the number of MCUs divided by 100), however this easily changed if desired to create a different number of restart segments. In addition, the conventionally-used parameters (e.g., height, width, desired quality versus compression data) are also sent to the JPEG compressor at step 304, whereby the compressor 66 compresses the data as represented by step 306.

Once the compressed (reorganized) image data 68 is available from the JPEG compressor 66, the data 68 is packetized for streaming transmission by a packetization process 70. As will be described in detail below, the data is packetized in accordance with the Active Streaming Format (ASF), a contemporary multimedia file format designed for streaming data packets at a specific rate.

In accordance with one aspect of the present invention and as will be described in detail below, the packetization process 70 stores the data in ASF data packets $80_1$–$80_n$ (FIG. 9) along with sufficient information to enable partially-received JPEG image data, to be displayed as a partial image. The present invention is also tolerant of loss of JPEG header information. As will become apparent, part of the information enabling the display of partially-received image data includes location information of the restart segments. To this end, at step 308 (FIG. 3), a parser 72 scans the compressed reorganized image data 68 and notes the locations of the restart segments as denoted by the restart markers therein. An array 74, table or the like may be used to store the locations. Note that the parser 72 may be separate from the packetization process 70 or included therein.

Lastly, as represented by step 310, at this time the data may either be saved in a file (for later loading, packetization and transmission) or packetized and transmitted to another computer. Of course, the data alternatively may be packetized before saving to a file. File construction and storage (step 314) is described below with primary reference to FIGS. 12 and 13, while packetization (step 312) is described with reference to FIGS. 9–11. Note that once the data is packetized (step 312), the data may be considered loss tolerant JPEG data 76, ready for transmission over a network or the like by a transmission mechanism 78.

Figure 4:
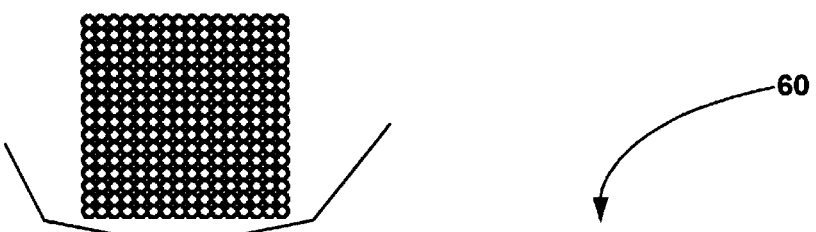
FIG. 4 is a representation of image data sectioned into JPEG Minimum coded units.
Figure 5:
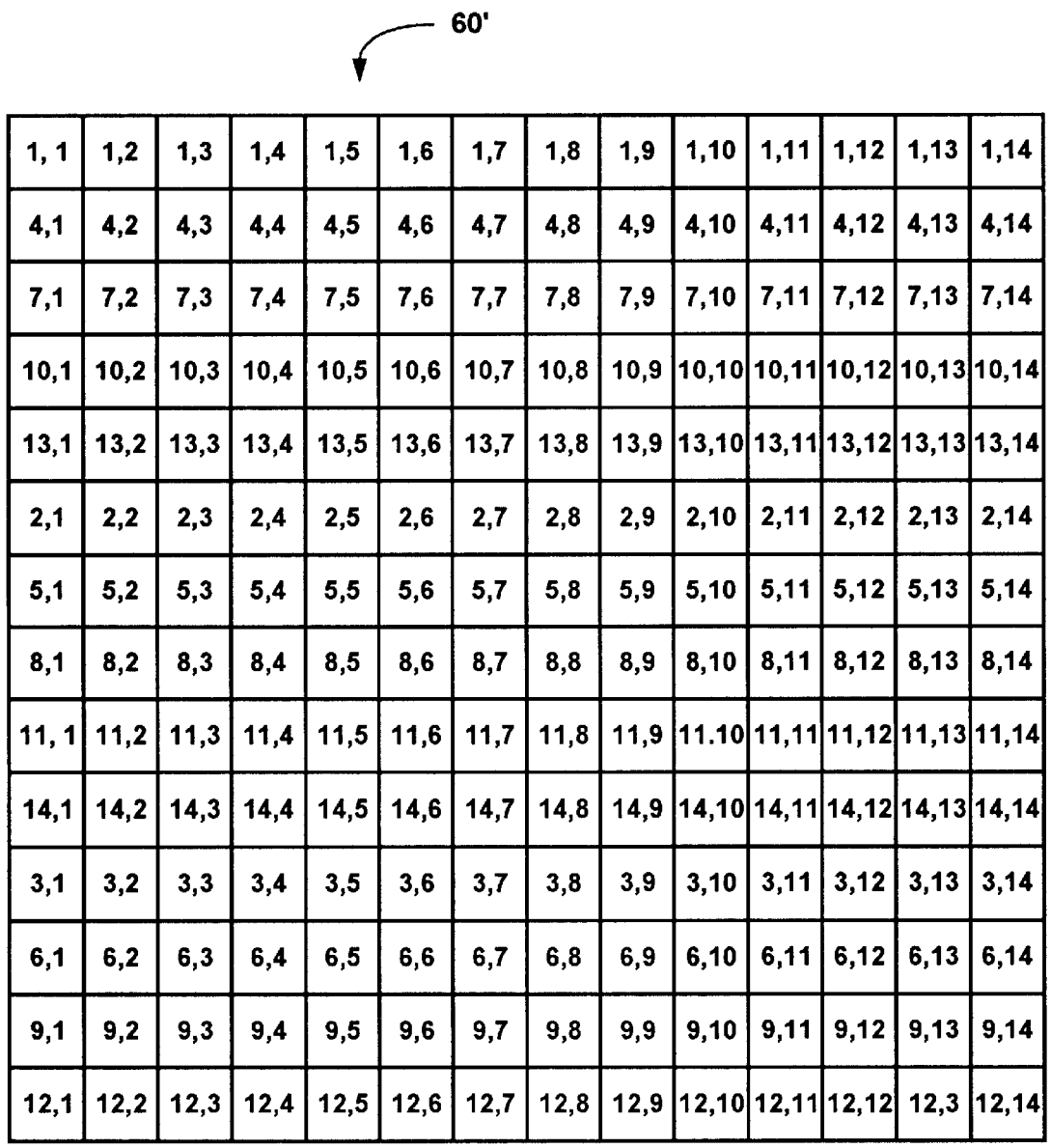
FIG. 5 is a representation of the image data of FIG. 4 having shifted rows of minimum coded units.

FIG. 4 represents a 14 by 14 MCU (196 by 196 pixel) original image data 60. Note that there is no requirement that the height and width of an image be the same number of MCUs. In FIG. 4, each MCU is identified by a row, column value, and comprises a sixteen by sixteen block of pixel values, as exemplified by the matrix of dots above the MCU labeled "1,4."

In accordance with one aspect of the present invention, the MCUs are reorganized (scrambled) before compression. In general, because the image is scrambled on an MCU-by-MCU basis, the reorganization has no effect on the JPEG compression. To reorganize the image, the MCUs are copied from the original image data 64 (source) to a new location in the system memory 25 (destination). As described in more detail below, this psuedo-randomly distributes the MCUs, whereby if a chunk of data is lost, the losses are scattered throughout the received image when decompressed and descrambled.

Figure 6:
FIG. 6 is a representation of the image data of FIG. 4 having reorganized minimum coded units in accordance with one aspect of the present invention.
Figure 7:
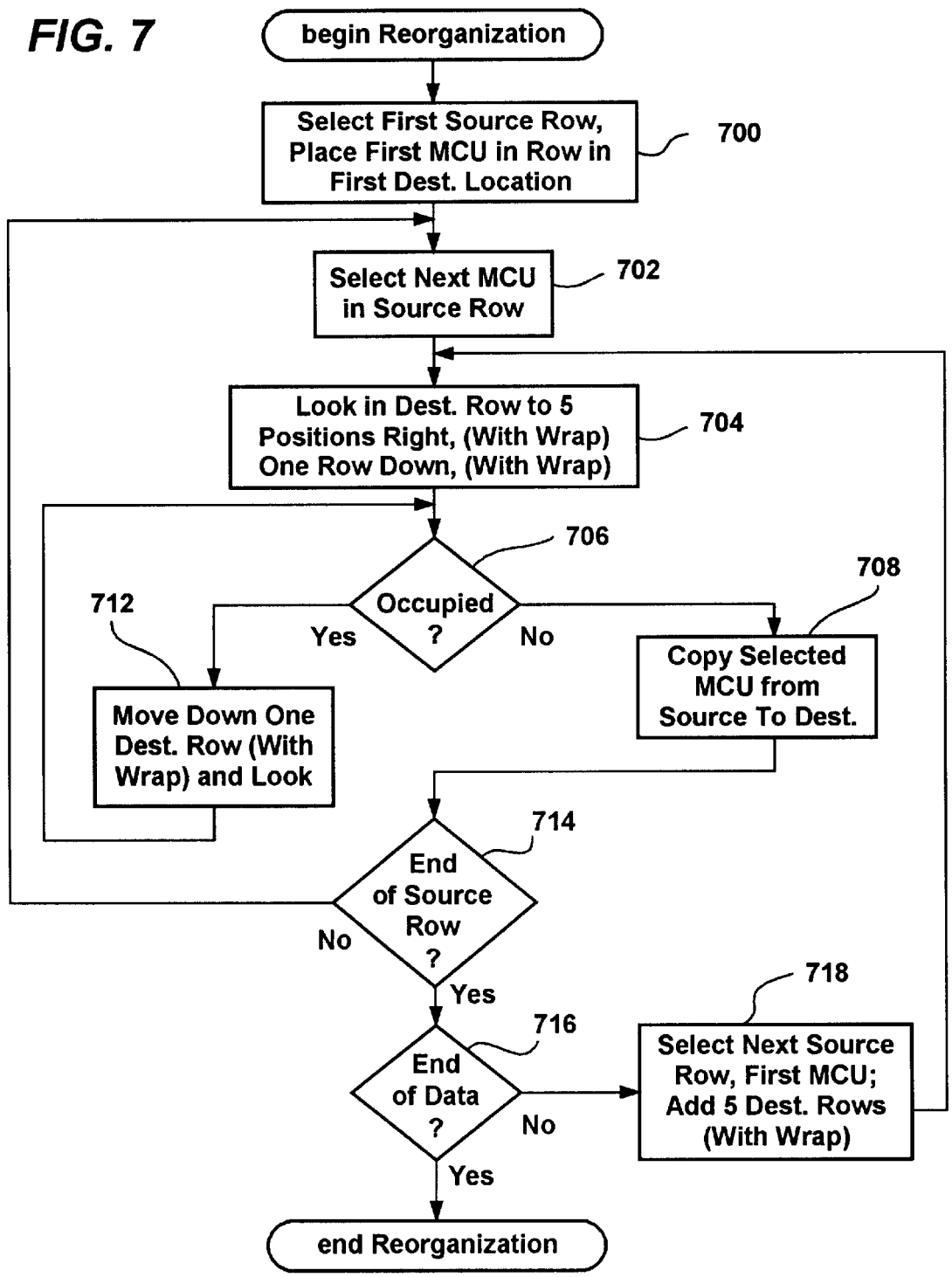
FIG. 7 is a flow diagram generally representing the steps taken in reorganizing image data.

FIG. 7 generally represents the steps taken to reorganize the original image data 60 into the reorganized image data 64. Note that FIG. 7 is for purposes of clarity in understanding one scrambling mechanism, however the same or other suitable scrambling results may be accomplished mathematically without performing all of the exemplified conditionals. In any event, to accomplish the reorganization, at step 700, the first source row is selected and the first MCU in that row (MCU 1,1) is placed into the first destination location (row one, column one). Then, at step 702, the next MCU in the source row is selected (MCU 1,2). Step 704 looks five positions to the right of the current MCU destination location and one row down. Note that if the end of column or the last row is reached while moving to the right or down, the counting wraps, i.e., if the sum, (e.g., 15), exceeds the maximum number of MCUs, (e.g., 14), subtract the maximum number from the sum and get the resultant row or column (e.g., 15 minus 14 equals 1). In any event, if the destination position is not already occupied by another MCU (step 706), then at step 708 the source MCU (1,2) is copied into that location in the destination (second row, sixth column) as shown in FIG. 6. Note that if the destination position was occupied, step 706 branches to step 712 where the next row down is selected and reviewed for availability.

After the MCU is copied, step 714 tests to determine if the end of the source row has been reached. If not, step 714 returns to step 702 where the next MCU in the source row is selected and placed in a destination location in the above-described manner. Ultimately, step 714 will detect the end of a source row, whereby the process branches to step 716 to see if all the MCUs have been copied. If so, the re-organization is complete, and the process ends. If not, the process continues to step 718 where the next source row and the first MCU therein is selected. However, to avoid a situation wherein the reorganization process would put the next row, same column immediately after the previous row, same column, (and thus potentially result in a missing vertical stripe), the rows are also effectively scrambled by shifting each row five rows from its prior row (with wrap). This is essentially shown in the shift image data 60' of FIG. 5, wherein row two has been shifted down five places, row three five places more, and so on. However, rather than actually shifting the rows before performing the rest of the scrambling, the same result can be accomplished in one operation by adding five to the destination row (with wrap). Step 718 performs this additional row-shifting operation, and then returns to step 704.

As can be understood by following the steps of FIG. 7, the MCUs shown in the original image data 60 of FIG. 4 are thus scrambled into the reorganized image data 64 of FIG. 6. The use of the number five for shifting positions is somewhat arbitrary, and was originally selected because it works well empirically, is a prime number and is not divisible by a power of two. Notwithstanding, it has been found that other non-prime numbers, including those divisible by two, also accomplish the desired result. In addition, there is no reason that the vertical shift and horizontal shift values be the same, nor that a value of one be chosen as the amount to shift the MCU down within a row of MCUs. As can be appreciated, other values may be selected, as long as the reorganization process and reverse reorganization process know what value or values were used. For example, the shifting information could be passed in the packet header or the like when transmitting.

Moreover, there is no reason that other scrambling mechanisms may not be employed, as long as the scrambling is reversible. Again, any mechanism can be used as long as the reverse reorganization process knows of and can reverse the reorganization process that was used. To let the descrambling process know which type of scrambling was used, for example, different UUIDs (Universally Unique Identifiers) may be used with different types of loss tolerant JPEG data, whereby the UUID indicates the technique used for scrambling.

Figure 8:
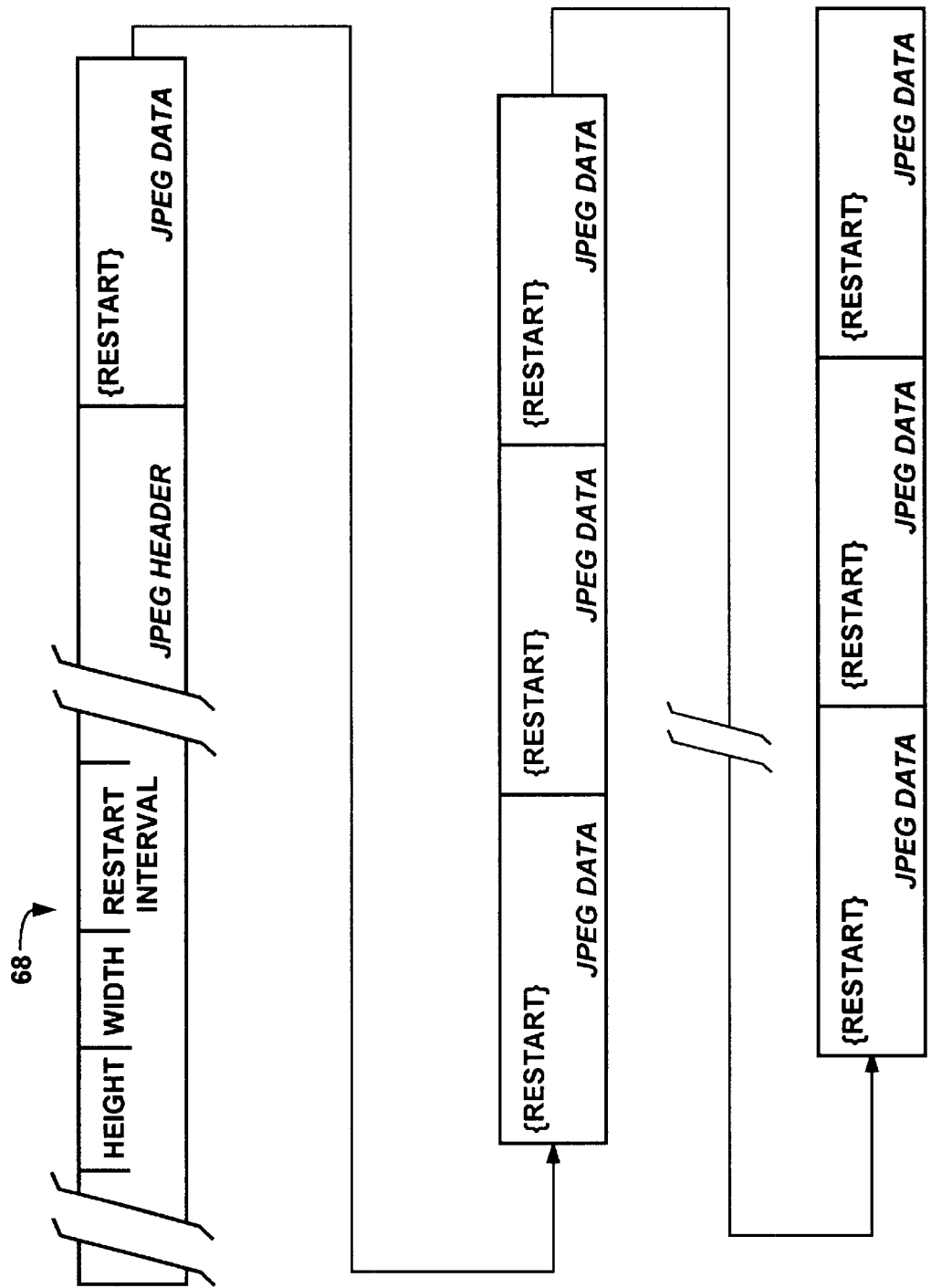
FIG. 8 is a block diagram representing JPEG data segmented in accordance with one aspect of the present invention.

In any event, once the reorganization process 62 is complete, the reorganized image data 64 and its appropriate parameters are passed to the JPEG compressor 66 as described above. When compression is completed, the JPEG compressor 66 returns compressed/reorganized image data 68 as generally represented in FIG. 8. Note that in FIG. 8, the height, width and restart interval are written into the JPEG header, and the JPEG data is broken up into a number of segments, each segment delineated by a restart marker.

After compression, the parser 72 walks through the compressed/reorganized image data 68 and stores the locations of the restart segments in an array or the like 74. Generally, each location is stored as its offset value into the JPEG entropy coded data stream. At this time, the compressed/reorganized image data 68 can either be saved to a file, or packetized for transmission over a network.

It should be noted that the scrambling of the data can take place after compression, i.e., the segments can be scrambled after compression rather than scrambling the MCUs prior to compression. Such a scheme only need allow the recipient to be able to determine which segments are present (or missing) and restore the received segments to their original order. Note that if restart segments are frequently inserted, (e.g., one per MCU), by scrambling the segments, lost contiguous data would not result in large gaps in the received image.

Figure 9:
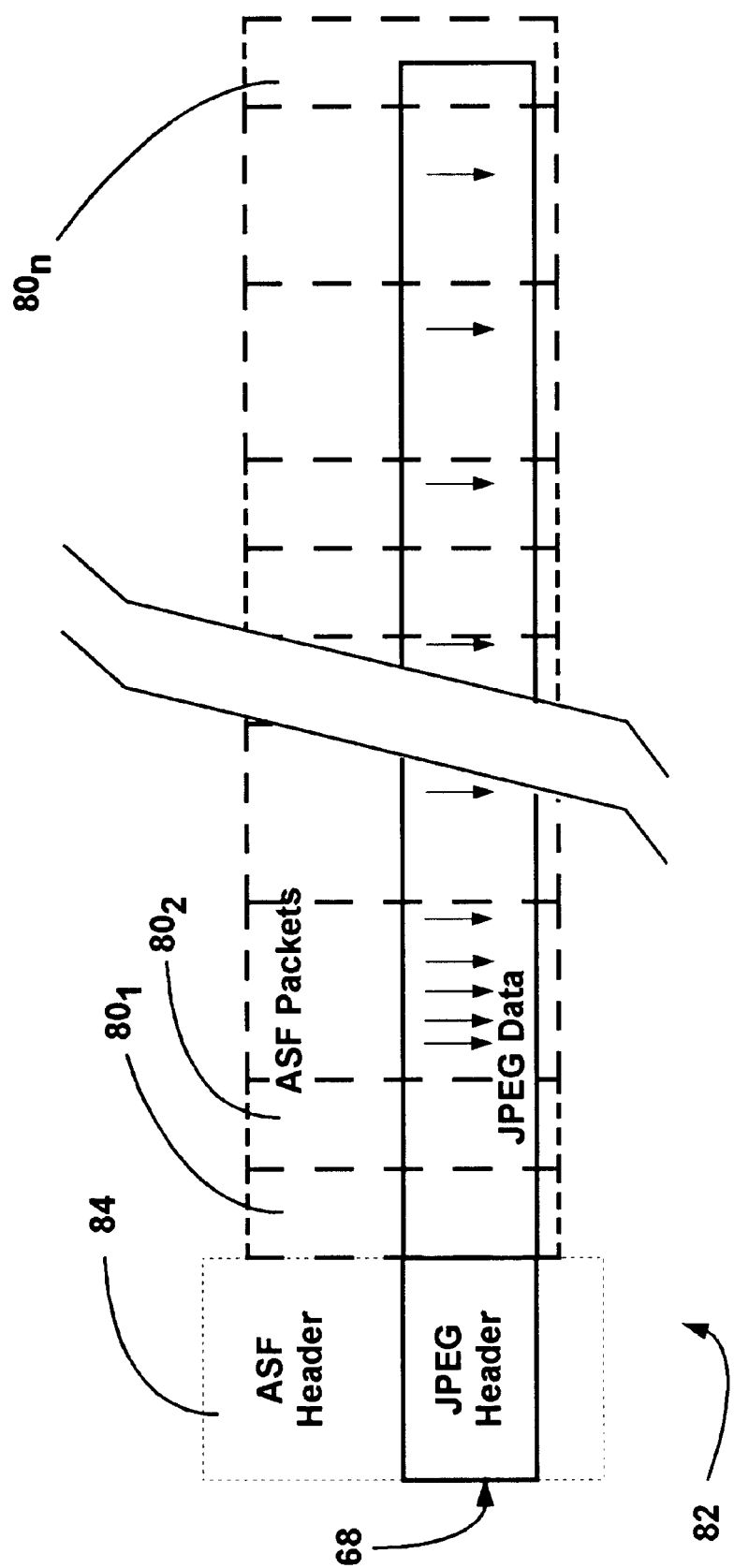
FIG. 9 is a representation of an Active Streaming Format file having segmented JPEG data packetized therein.

To packetize the data, the Active Streaming Format (ASF) is preferably used. ASF streams packets of data across a network at a specific bandwidth or bit rate. The structure of an ASF file 82 with packetized JPEG data therein is generally shown in FIG. 9, wherein the arrows represent the location of the JPEG restart markers. Note that the size of the ASF packets $80_1$–$80_n$ are somewhat arbitrary with respect to the size of the JPEG data segments. Indeed, one segment can span multiple ASF packets and parts of packets, and/or multiple segments (plus possibly parts thereof) may be in a single ASF packet.

As is understood, the ASF packets $80_1$–$80_n$ are not guaranteed to arrive, but the ASF header 84 is guaranteed to arrive. In keeping with the present invention, the image may still be partially viewable even if packets do not arrive. However, those packets that do arrive contain image data that needs information in the JPEG header (particularly the height, width and restart interval) in order to be useful. Thus, the JPEG header is written into the ASF header 84 to guarantee its arrival for use by the JPEG data that does arrive. Note that (assuming a standard JPEG compressor 66 is used) the JPEG header information is the same for all loss tolerant JPEGs, with the exception of the height, width and restart interval therein.

Figure 11:
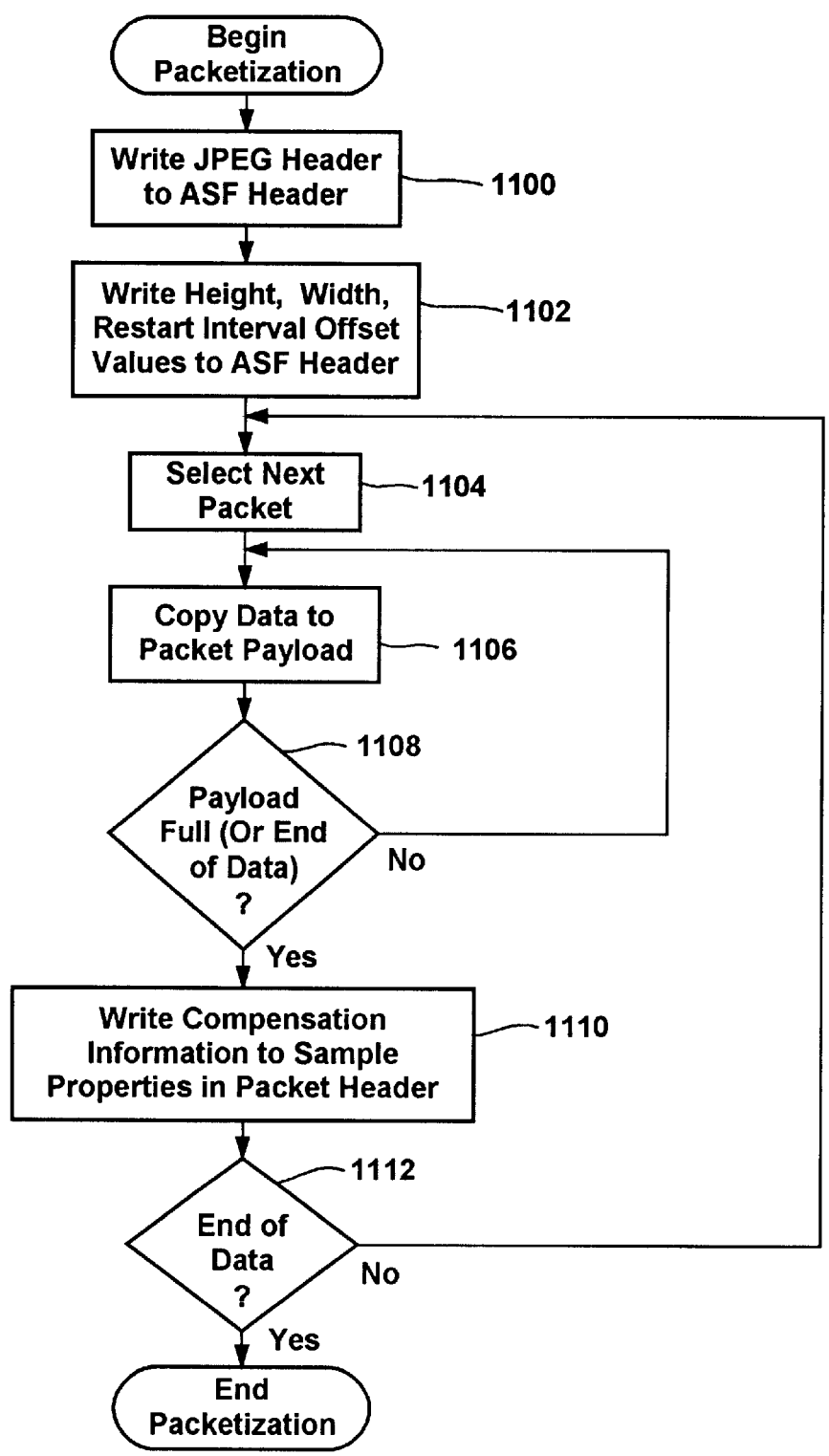
FIG. 11 is a flow diagram generally representing the steps taken to a packetize image data in accordance with one aspect of the present invention.

FIG. 11 generally shows the steps taken to packetize the data for transmission. First, at step 1100, the JPEG header is written to the ASF header 84 as described above. Then, at step 1100, the offset locations of the height, width and restart interval within the JPEG header are written to the ASF header 84. This allows the recipient to know where to write the values contained in the ASF packets, thereby reconstructing a valid ASF header 112 for a given JPEG image.

Figure 10:
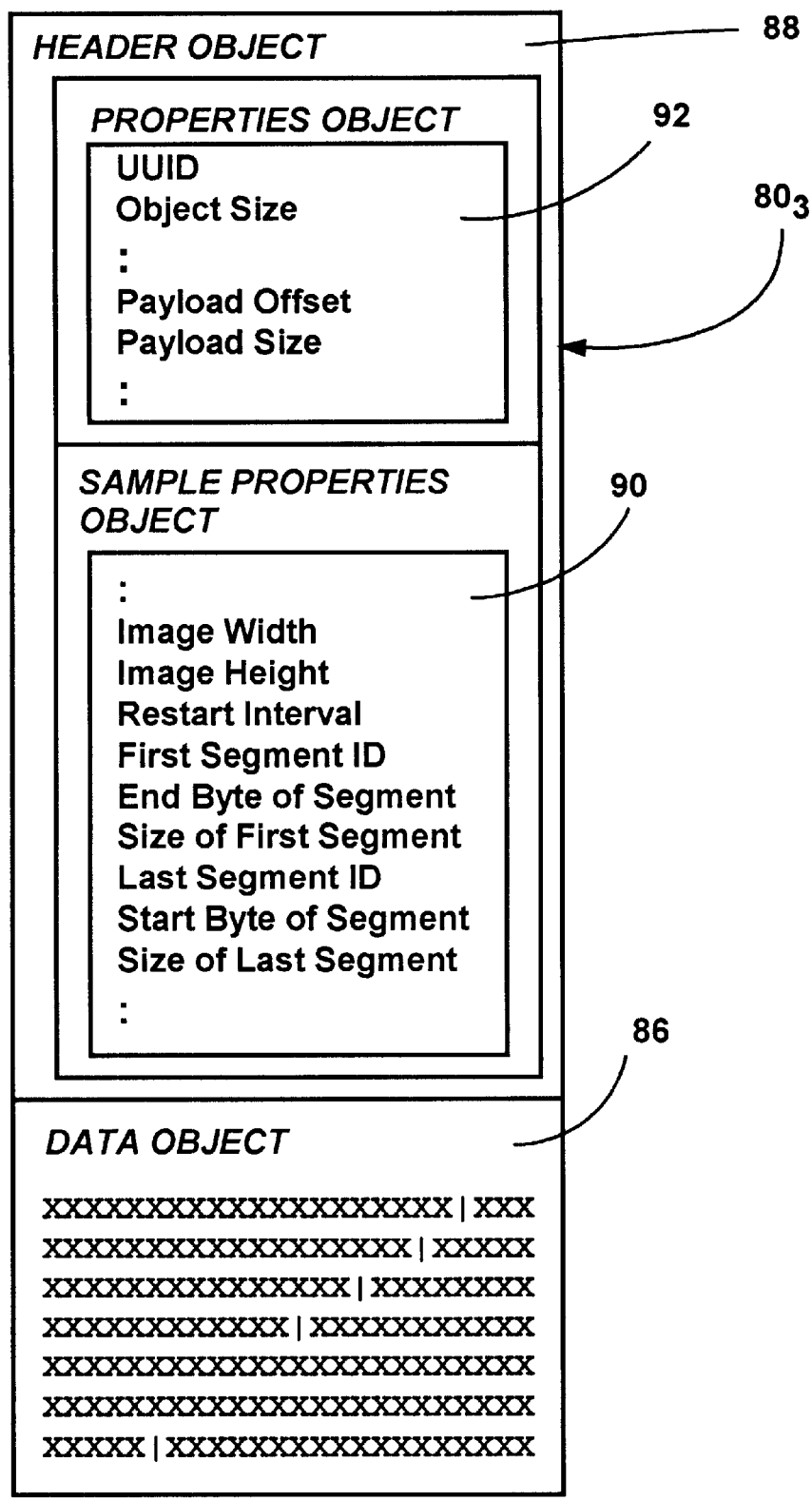
FIG. 10 is a representation of an active streaming format packet.

At this time, the JPEG image data, which includes the restart markers, is ready to be written into the ASF packets $80_1$–$80_n$. However, as described above, the various data segments do not necessarily align with the data object, known as the payload 86, of each ASF packet (FIG. 10). Thus, at step 1104, an ASF packet is selected, (at this time the first packet 801), and, as represented by steps 1106–1108, the JPEG data is copied into its payload 86 until the payload 86 is full or there is no more JPEG data to copy.

When the payload 86 is full, (or when there is no more JPEG data), step 1110 writes certain information into the header object 88 of each ASF packet (e.g., $80_1$) that allows the process at the receiving end to compensate for missing packets. More particularly, the identity of the first restart segment in the payload 86 (i.e., a number corresponding to its position in the sequence of restart segments), the end byte of this segment and the total size of this segment are determined and written into the sample properties object 90 of the ASF packet 80, (an exemplary packet, 803, is shown in FIG. 10). Similarly, the identity of last restart segment present in the payload 86 is identified, and its size and starting byte are detected and written into the sample properties 90 of the ASF packet (FIG. 10). Also, the image width, image height and restart interval are written into the sample properties 90. Further, a built-in feature of ASF is that the entire size of the ASF packet $80_1$, the payload offset and the payload size are written into the properties object 92 of each ASF packet. As will be described in more detail below, with this information and the compensation information, a recipient is able to determine which segments are present from a given set of packets. Thus, once this information is in the packet, the packet may be streamed by the transmission mechanism 78 to one or more recipients.

After the compensation information is written into the packet, step 1112 tests to determine if all the JPEG data has been packetized. If not, step 1112 returns to step 1104 where the next ASF packet (802) is selected. The process thus repeats until all of the JPEG data is packetized.

Instead of packetizing the compressed/reorganized data 68 for transmission, the data 68 may be written to a file 94. Of course, the data may also be packetized before writing to a file. In any event, writing data to a file is often convenient because the compression consumes substantial resources, and thus it may be desirable to perform the majority of the work in advance rather than at transmission time. FIG. 12 shows alternative components for writing the data 68 to a file 94 of the file system 35, and the flow of data therethrough, wherein like components to those of FIG. 2 have been assigned like numbers. In general, the flow follows that of FIGS. 2 and 3, but rather than packetize the data, a preferred file writing mechanism 96 constructs the file 94 as represented in FIG. 13.

As shown in FIG. 13, the file includes a file magic number and a header magic number (the two four byte strings "DJFM" and "DJHM" which identify the file as a loss tolerant JPEG file and identify the header). A four-byte field is provided for the size, in bytes, of the JPEG header data, followed by the JPEG header data. Next, a map section is provided, delineated by the four-byte string "DJMM", followed by the size, in bytes of the map section, the map data containing the height, width and restart interval, and an array of the restart segment locations (offset) as detected by the parser 72. Lastly, a data magic number "DJEM" indicates the start of the compressed/reorganized JPEG data, followed by a four-byte field for the size, in bytes, of this data, followed by the data itself. Note that the necessary data is maintained, such that the file can be later read without preprocessing, scrambling, compressing or parsing in order to rapidly provide the appropriate data therein to the packetization process 70 when transmission is desired.

Figure 14:
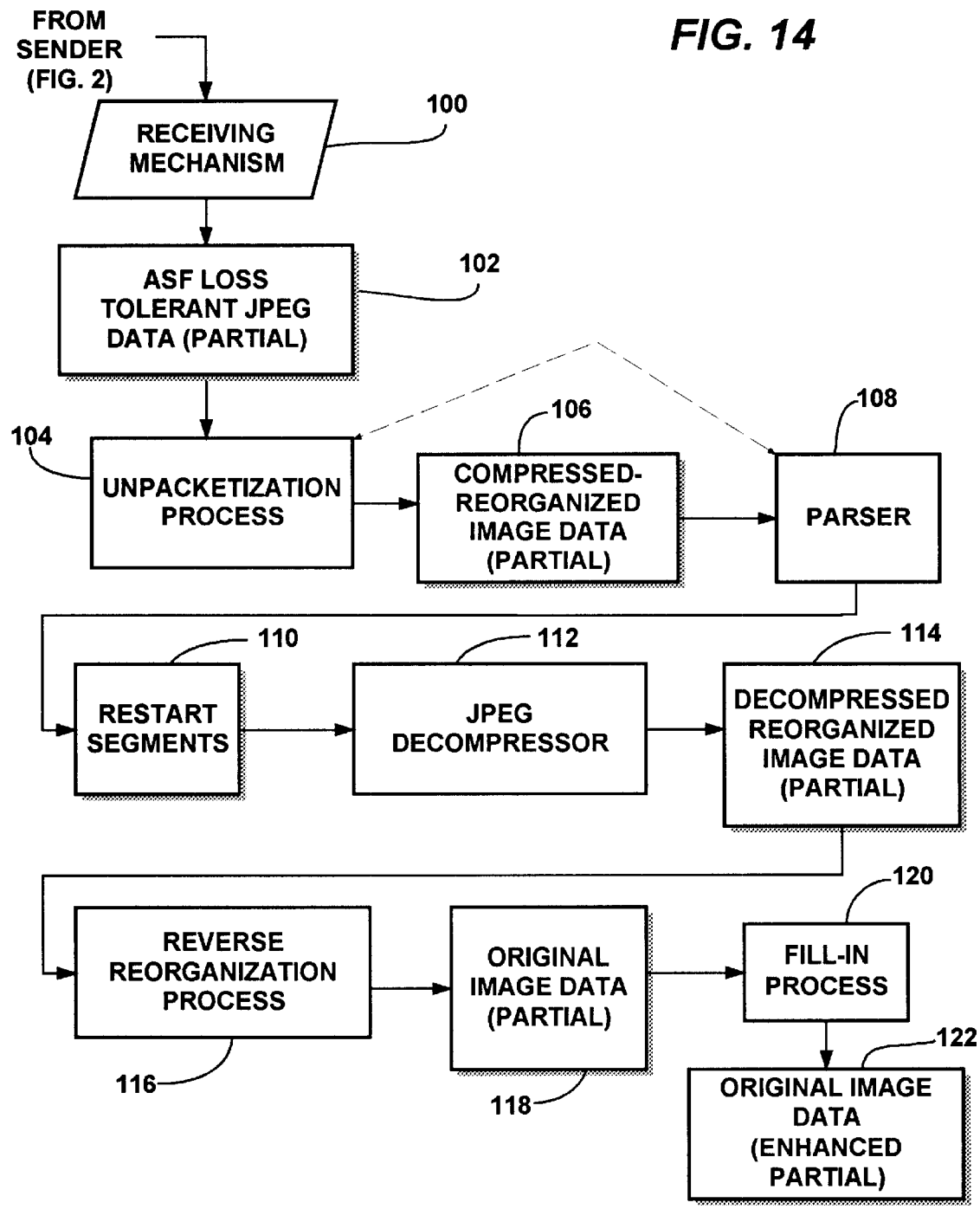
FIG. 14 is a block diagram representing various components for reconfiguring loss tolerant JPEG data into viewable image data in accordance with another aspect of the present invention.

Turning now to a consideration of the receipt and decompression of the loss tolerant JPEG data, as shown in FIG. 14, a receiving mechanism 100 receives the ASF data packets from the transmission mechanism 78 (FIG. 2). The ASF header 84 is guaranteed to arrive, however the ASF packets $80_1$–$80_n$ may or may not arrive. Thus, the loss tolerant JPEG data may only be partially received at shown by the parenthetical "(PARTIAL)" in the data block 102.

Figure 15:
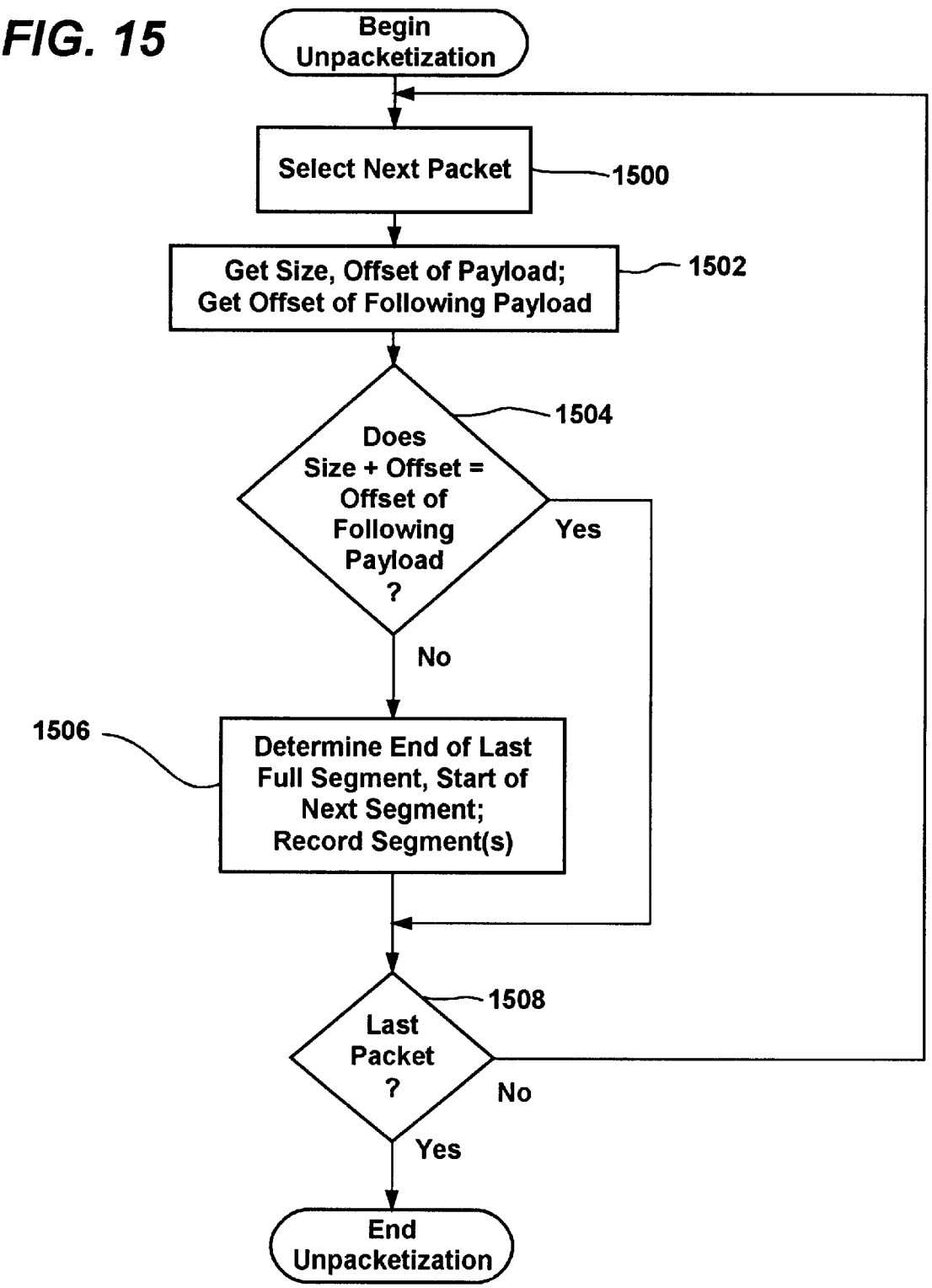
FIG. 15 is a flow diagram generally representing the steps taken to unpacketize the packetized loss tolerant JPEG data.

The (possibly partial) loss tolerant JPEG data 102 is fed to an unpacketization process 104, as represented by the general flow diagram of FIG. 15. For purposes of the present example, it will be assumed that the first packet 80, arrived, although as will become apparent below, the first packet need not arrive for the partial image to be displayed. To unpacketize the data into compressed, scrambled image data 106, once at least two packets have been received, a parser 108 (which may be part of the unpacketization process 104) walks through the packets to determine which segments have completely arrived. Step 1500 selects a first packet. At step 1502, the size and offset of the payload of the first packet received is determined from the properties object 92, and the offset of the payload from the next packet that arrived is determined from its properties object 92. In general, anytime the size plus the offset of a payload is not equal to the offset of the next payload, at least one payload (i.e., the packet) has been lost. Step 1504 makes this evaluation, and if a packet has been lost, step 1504 branches to step 1506.

At step 1506, the compensation information from the surrounding payloads is examined to determine which segments have been completely received and which are missing. More particularly, the last segment that was fully received is either the last segment identified in the payload 86 if all its data follows it (as determined by the segment size in the sample properties object 90) or the segment that preceded it if a less than all of its data is present in the payload 86. Step 1506 then records the segment (or range of segments) that have been completely received. The start of the next segment (e.g. its identity and offset) in the next payload is also noted. Then, if there are more packets, the process returns to step 1500 whether next packet is selected as the current packet, and the process repeated. At the end of the unpacketization process 104, the restart segments 110 that have been fully received, (and are thus available for decompression), along with their offsets into their respective payloads, are known. Note that other techniques for determining which segments have completely arrived and which have been lost are feasible.

Although not specifically represented in FIG. 15, if packets sent at the beginning do not arrive, the segment information in the first packet that does arrive can be determined as described above. Indeed, this information can be automatically retrieved from the first packet that does arrive. If it is the first actual packet, the very first JPEG segment will be identified as the first available segment, otherwise whatever first complete segment that did arrive will be recorded as being available. Thus, it is not necessary that the actual first packet arrive.

Figure 16:
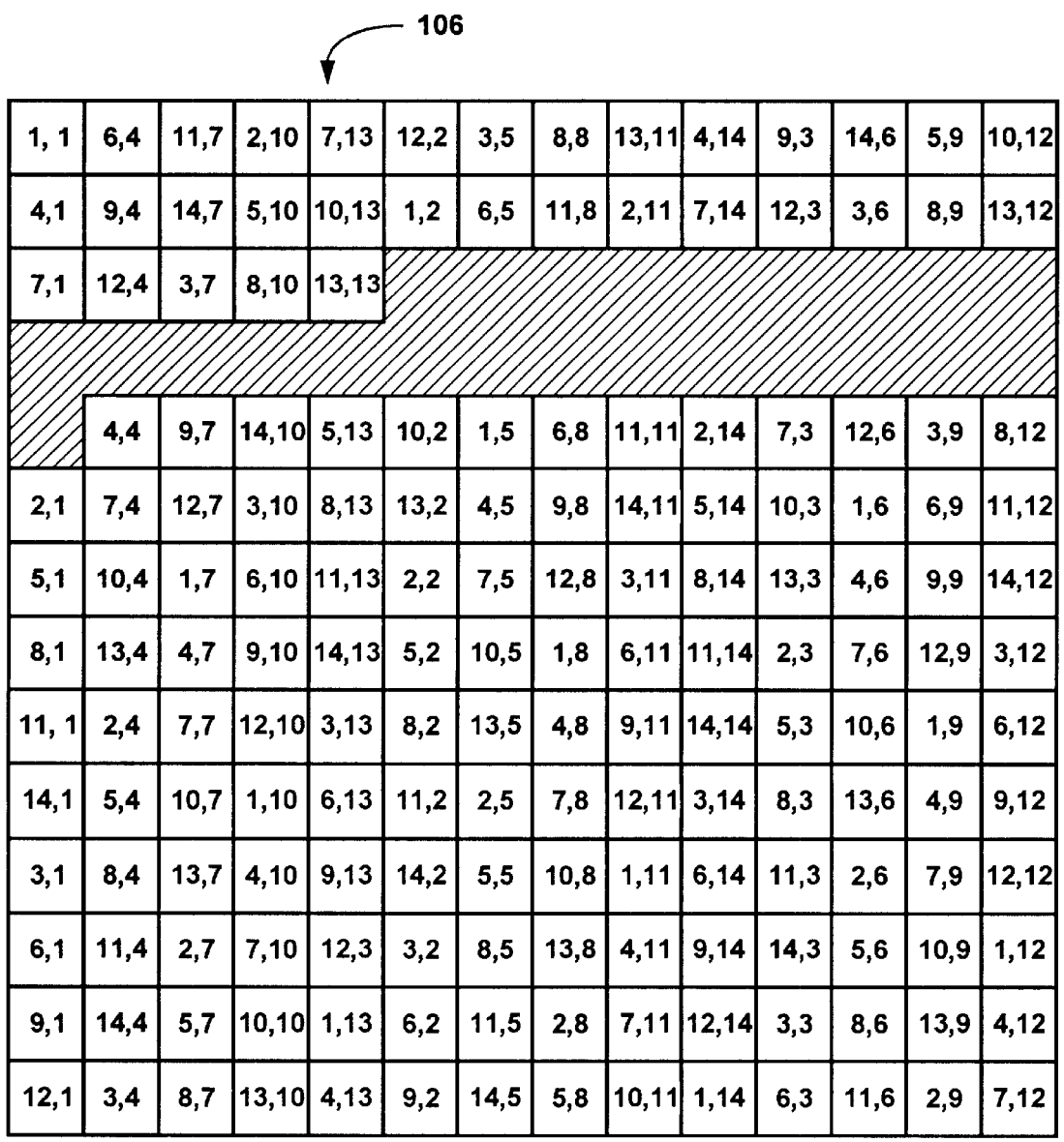
FIG. 16 is representation of partially received image data.

To decompress, the height, width and restart interval known from the ASF header 84 are provided to the JPEG decompressor 112, by creating a complete header out of the reliably received header 84 which may not have correct values, and these correct values. Note that the JPEG decompressor 112 simply takes a stream of bits as its input. Then, each of the restart segments that fully arrived are fed to the JPEG compressor 112. Any missing restart segments are skipped over during decompression. The end result is scrambled bitmap image data 114, with potentially empty space where data was lost. FIG. 16 represents such image data 114, where a contiguous amount of data was lost.

Figure 18:
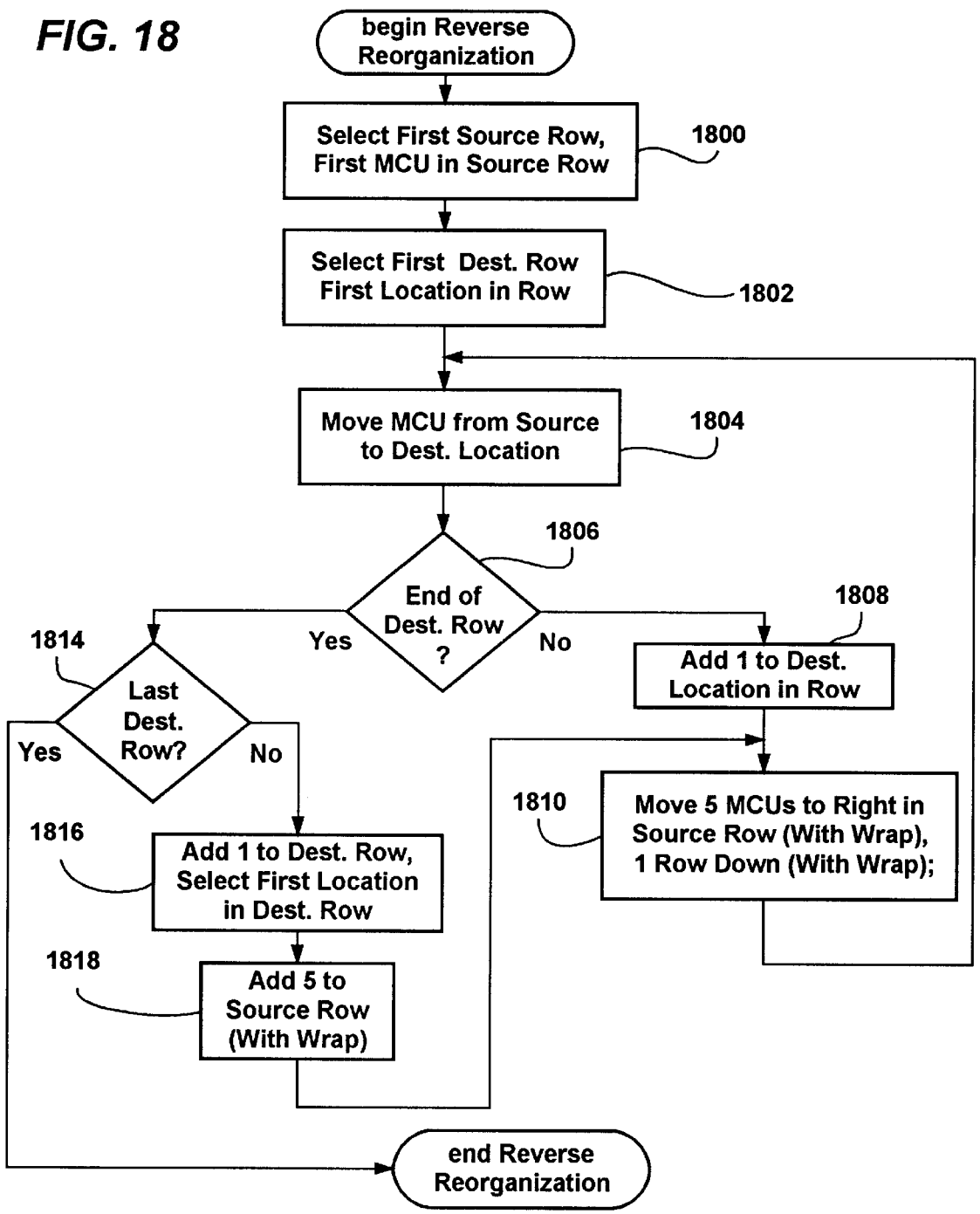
FIG. 18 is a flow diagram representing the general steps taken by the reverse reorganization process.

Next, the (possibly partial) scrambled image data 114 is fed to a reverse reorganization process 116 (i.e., a descrambling process). In general, the reverse reorganization process 116 takes the scattered MCUs as a source and copies them into a destination location in the system memory 25 corresponding to their original location. To this end, FIG. 18 generally represents the steps taken to move the MCUs back to their original locations. Again, the steps of FIG. 18 are shown and described for purposes of clarity, and the same result may be alternatively accomplished mathematically.

At step 1800, the first source row and the first MCU in the source row (1,1) is selected, while at step 1802 the first destination row and first location in that row (1,1) is chosen as the selected destination. Then, at step 1804, the MCU is copied from the source to the destination location. Step 1806 tests to see if the end of the destination row has been reached, and if not, the destination location is moved one count to the right at step 1808. Next, at step 1810, the source is adjusted by moving five MCUs to the right (with wrap as necessary) and one row down (with wrap). The process then returns to step 1804 where the MCU is copied from the source to the destination and the process repeated.

Eventually, the end of the destination row is detected at step 1806, whereby the process branches to step 1814 to determine if the image has been completely descrambled. If so, the process 116 ends. If not, step 1814 branches to step 1816 where the destination row is incremented and the destination column is reset to the first column. Next, step 1818 adds five to the source row (with wrap as needed), since the rows were originally shifted by five as described above. Then, step 1818 returns to step 1810 where the source is adjusted by five columns to the right and one row down (with wrap if appropriate), and the process 116 returns to step 1804. As can be appreciated by following the process flow described in FIG. 18 with reference to the image data shown in FIGS. 16 and 17, the image 118 is restored, minus any lost data. However, in keeping with the invention, the continuous block of lost data is distributed psuedo-randomly throughout the image 118, and thus no continuous stripe of missing pixels is present therein. Note that if too much data is lost (e.g., greater than fifty percent), the image can be rejected rather than displayed.

Figure 19:
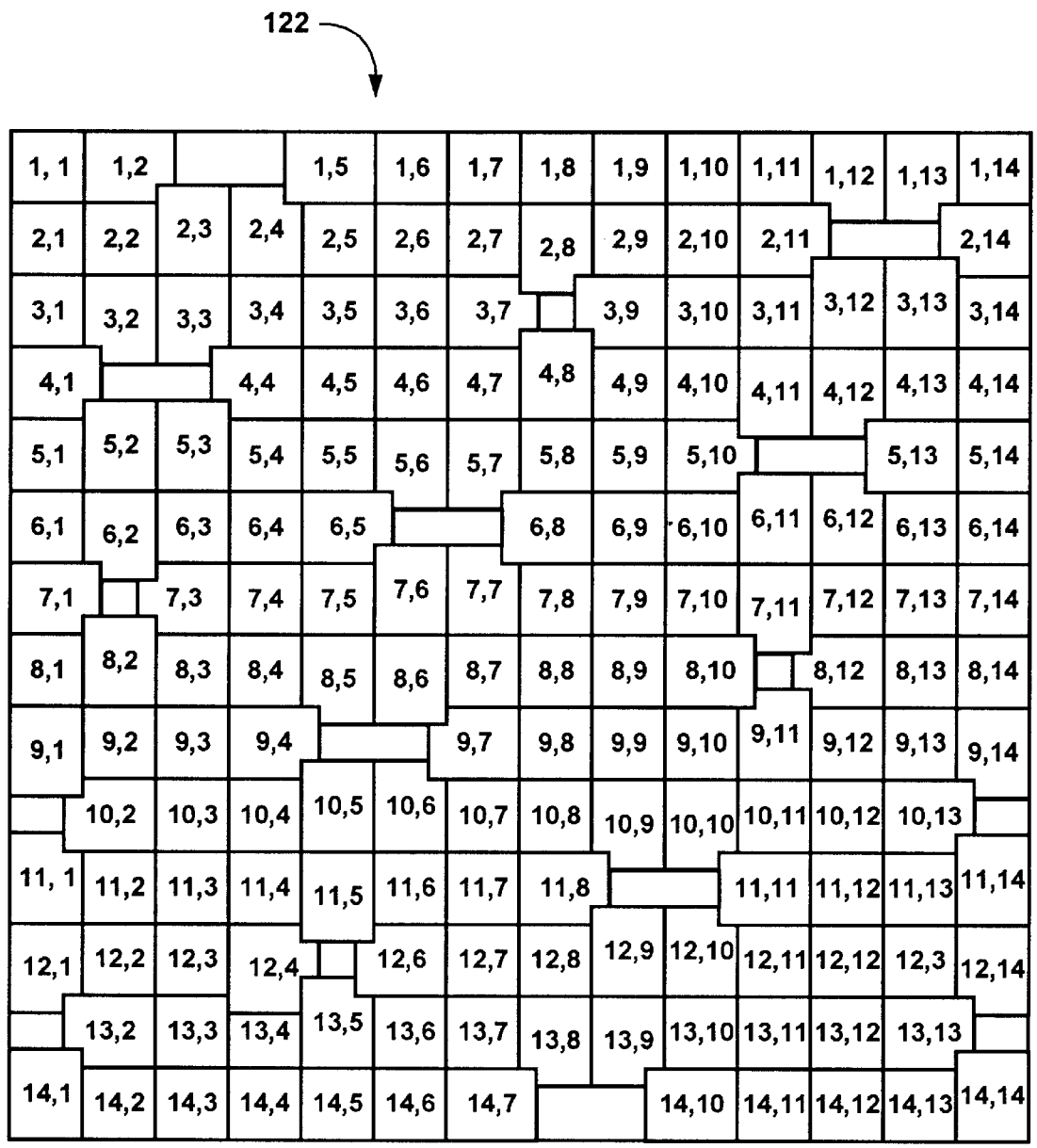
FIG. 19 is a representation of the partially received image data of FIG. 17 after undergoing image enhancement.

Lastly, before displaying, the image data 118 can be provided to a fill-in process 120 or the like to enhance the data where chunks are missing. For example, one fill-in process replaces missing data with a blend of the surrounding MCUs. FIG. 19 generally represents the enhanced image 122 after undergoing such a fill-in process.

It can be readily appreciated that the present invention is not limited to JPEG data, but will provide benefits with any data compressed via similar lossy compression algorithms, or other image compression schemes that encode in discrete blocks, wherein part of the data may be lost in transmission. For example, MPEG is particularly applicable, as an MPEG macroblock is conceptually equivalent to a JPEG MCU.

As can be seen from the foregoing detailed description, there is provided a system and method for configuring JPEG data for streaming transmission that tolerates lost data, enabling a partially received image to be displayed while reducing the likelihood of continuous gaps in a partially-received image. The system and method work with existing JPEG compressors and decompressors, and further enable the configured JPEG data to be stored for subsequent recall and transmission. The system and method are flexible, efficient, reliable and extensible.

While the invention is susceptible to various modifications and alternative constructions, a certain illustrated embodiment thereof is shown in the drawings and has been described above in detail. It should be understood, however, that there is no intention to limit the invention to the specific form disclosed, but on the contrary, the intention is to cover all modifications, alternative constructions, and equivalents falling within the spirit and scope of the invention.

What is claimed is:

1. A method of configuring data, comprising, reorganizing a plurality of data sections into a reversible pattern of reorganized data, for at least one of the data sections that is reorganized, the reorganizing of the data section being performed independent of a temporal decoding relationship with any of the other data sections, compressing the data sections into a plurality of compressed segments that can be independently decompressed from one another, and maintaining segment location information identifying the locations of the compressed segments.

2. The method of claim 1 wherein the data is image data that is organized into two-dimensional arrays of pixel information, and wherein reorganizing the data sections includes shifting the locations of at least some of the two-dimensional arrays of pixel information relative to one another, the shifting occurring independent of a relationship among the data sections.

3. The method of claim 2 wherein the two-dimensional arrays of pixel information are JPEG minimum coded units.

4. The method of claim 2 wherein the two-dimensional arrays of pixel information are MPEG macroblocks.

5. The method of claim 2 wherein the at least some of the arrays of pixel information are shifted horizontally by five places and vertically by at least one place from their original locations.

6. The method of claim 1 wherein compressing the data comprises providing the data to a JPEG compressor.

7. The method of claim 6 further comprising providing a restart interval parameter to the JPEG compressor.

8. The method of claim 1 wherein maintaining information identifying the locations of the segments includes parsing the compressed data.

9. The method of claim 1 further comprising packetizing the compressed segments for transmission.

10. The method of claim 9 wherein packetizing the compressed segments for transmission includes writing selected segment location information into at least one packet.

11. The method of claim 10 wherein writing selected segment location information into at least one packet includes identifying first and last segments in a selected packet, and writing the segment location information corresponding to those first and last segments into the selected packet.

12. The method of claim 1 further comprising writing the compressed data and the segment location information to a file.

13. The method of claim 1 further comprising decompressing the compressed segments, and reversing the reorganization of the reorganized data into original image data.

14. The method of claim 13 further comprising receiving at least some of the compressed segments, receiving at least some segment location information corresponding to the received segments, determining from the segment location information which segments have been received, and wherein decompressing includes separating the segments that have been received into discrete segments of data for individual decompression thereof.

15. The method of claim 14 wherein less than all of the segments have been received, and further comprising enhancing the image at locations corresponding to the data that was not received.

16. A system for configuring image data, comprising, a reorganization component for reorganizing a plurality of data sections, for at least one of the data sections that is reorganized, the reorganizing of the data section being performed independent of a temporal decoding relationship with any of the other data sections, the data sections being reorganized into a reversible pattern of reorganized image data, a compressor for compressing the data sections into compressed segments that can be independently decompressed from one another, means for identifying the locations of the compressed segments, and means for maintaining the locations of the compressed segments.

17. The system of claim 16 wherein the data is image data organized into two-dimensional arrays of pixel information, and wherein the reorganization component includes means for changing the locations of at least some of the two-dimensional arrays of pixel information relative to one another, the changing occurring independent of a relationship between the data sections.

18. The system of claim 17 wherein the two-dimensional arrays of pixel information are sixteen by sixteen JPEG minimum coded units, and the compressor is a JPEG compressor.

19. The system of claim 18 further comprising means for providing a restart interval parameter to the JPEG compressor.

20. The system of claim 16 wherein at least some of the data comprises pixel information, and wherein the reorganization component reorganizes the data by shifting at least some of the pixel information by five places horizontally from their original locations.

21. The system of claim 16 including a memory, wherein the means for maintaining the locations of the compressed segments includes an array in the memory.

22. The system of claim 16 further comprising means for packetizing the compressed segments, including means for writing segment location information into at least one packet.

23. The system of claim 22 further comprising means for identifying the first and last segments in a selected packet.

24. The system of claim 16 further comprising means for writing the compressed data and the segment location information to a file.

25. The system of claim 16 further comprising a decompressor for decompressing the compressed segments, and a reverse reorganization component for descrambling reorganized data into original image data.

26. The system of claim 25 further comprising a receiving mechanism for receiving at least some of the compressed segments.

27. The system of claim 26 wherein less than all of the segments have been received, and further comprising a mechanism for determining which of the segments have been received.

28. A method of configuring data, comprising, compressing the data into compressed segments that can be independently decompressed from one another, packetizing the compressed segments into packets for transmission, writing selected segment location information into a selected packet by identifying first and last segments in the selected packet, and writing the segment location information into a location in the selected packet that is separate from the first and last segments.

29. A method of configuring JPEG image data grouped into JPEG minimum coded units (MCUs), comprising, reorganizing the original pattern of MCUs into a reversible pattern of reorganized MCUs, for at least one of the MCUs that is reorganized, the reorganization of the MCU being performed independent of a temporal decoding relationship with any of the other MCUs, providing restart interval information to a JPEG compressor, providing the reorganized MCUs to the JPEG compressor such that the data is compressed into restart segments that can be independently decompressed from one another, determining the locations of the compressed segments, organizing the segments into packets including writing into at least one of the packets the location of at least one of the segments in that packet, and transmitting the packets.

30. The method of claim 29 further comprising receiving less than all of the packets, determining from the location information which of the packets have been received, decompressing those packets into partial reorganized image data, descrambling the partial reorganized image data into partial original image data, and displaying the partial original image data.

* * * * *